US010509888B1

(12) United States Patent
Biswas et al.

(10) Patent No.: US 10,509,888 B1
(45) Date of Patent: Dec. 17, 2019

(54) SYSTEM AND METHOD FOR FORMING INTEGRATED DEVICE

(71) Applicant: TAIWAN SEMICONDUCTOR MANUFACTURING COMPANY LTD., Hsinchu (TW)

(72) Inventors: Hiranmay Biswas, Kolkata (IN); Kuo-Nan Yang, Hsinchu (TW); Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/134,419

(22) Filed: Sep. 18, 2018

(51) Int. Cl.
*G06F 17/50* (2006.01)
(52) U.S. Cl.
CPC ...... *G06F 17/5081* (2013.01); *G06F 17/5072* (2013.01)

(58) Field of Classification Search
CPC .................. G06F 17/5081; G06F 17/5072
See application file for complete search history.

(56) References Cited

U.S. PATENT DOCUMENTS

| 10,263,011 | B1* | 4/2019 | Haigh | G06F 17/5077 |
|---|---|---|---|---|
| 2015/0149976 | A1* | 5/2015 | Tien | G06F 17/5072 716/120 |
| 2018/0314771 | A1* | 11/2018 | Lee | G06F 17/5031 |
| 2019/0236234 | A1* | 8/2019 | Biswas | G06F 17/5072 |

* cited by examiner

*Primary Examiner* — Stacy Whitmore
(74) *Attorney, Agent, or Firm* — WPAT, P.C., Intellectual Property Attorneys; Anthony King

(57) ABSTRACT

A method for forming an integrated device is provided. The method includes the following operations. A first circuit layout having a first power path and a second power path is provided. The first power path and the second power path are aligned in a first direction. A first pitch between the first power path and the second power path is analyzed. It is determined whether the first pitch is less than a threshold pitch. If the first pitch is less than the threshold pitch, the second power path is modified in a second direction. The second direction is perpendicular to the first direction.

20 Claims, 9 Drawing Sheets

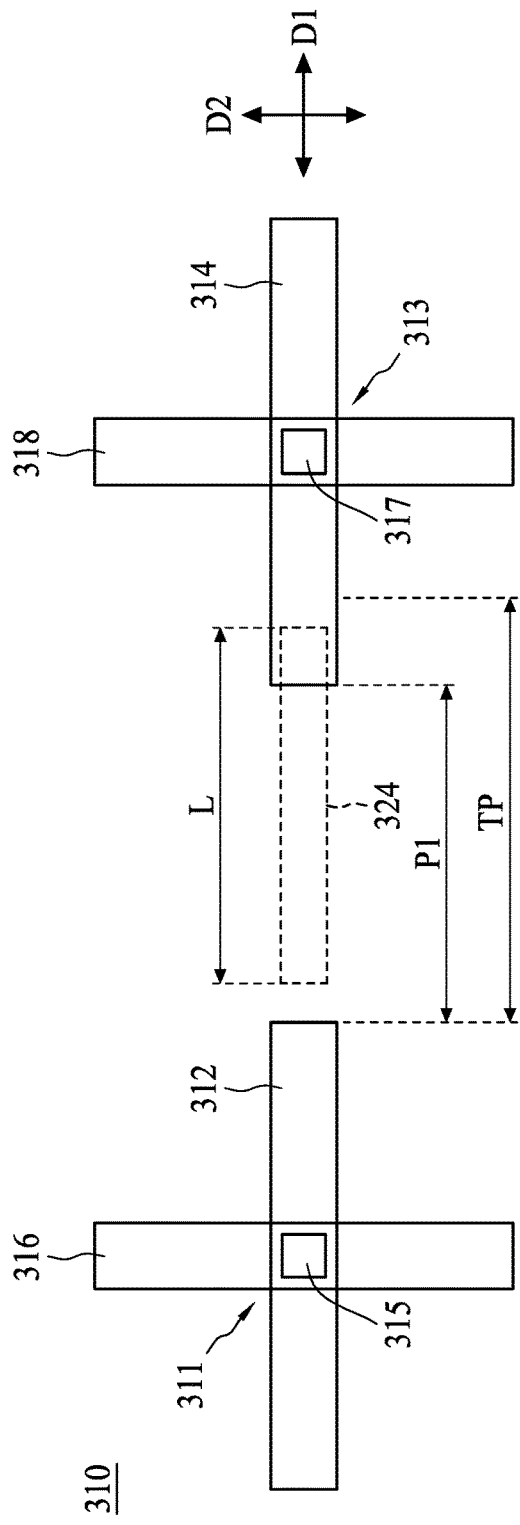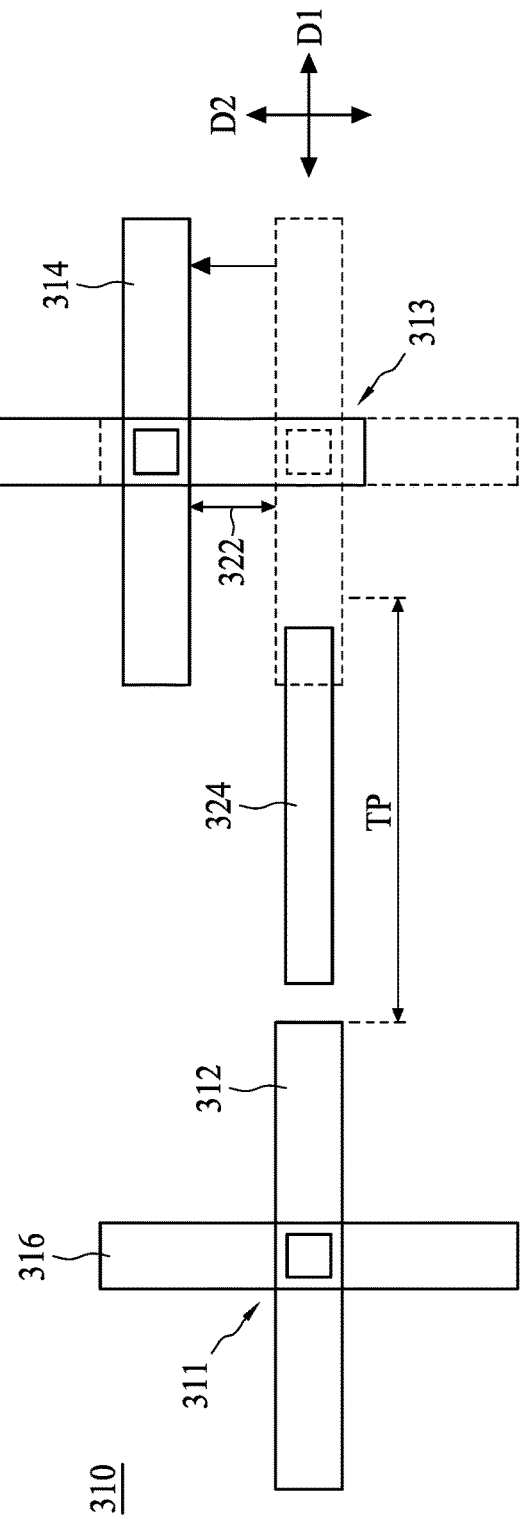

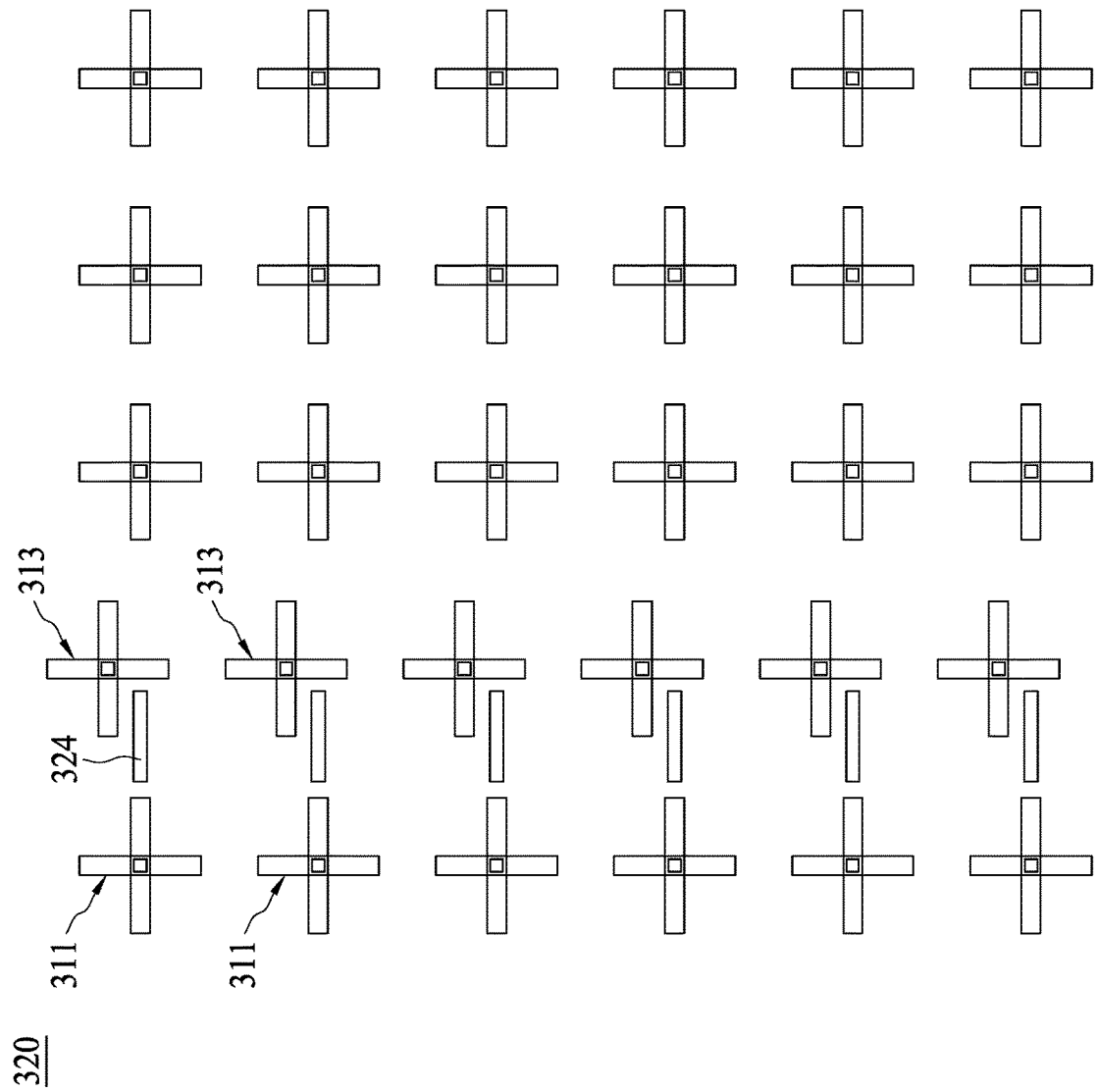

SYSTEM AND METHOD FOR FORMING INTEGRATED DEVICE

BACKGROUND

In advanced semiconductor fabrication technologies, the feature density and operating frequency of devices are being progressively raised in order to achieve better performance. To enable such advances, electronic design automation tools are widely used for facilitating design flows and ensuring the functional integrity of the manufactured integrated circuits (IC). The electronic design automation tools aid in establishing a software platform to evaluate the physical performance and electrical properties of the IC before the chip is fabricated. A variety of built-in device models and design rules are used to verify the performance of the circuit design, such as the functionality, power consumption and feature geometries. The software platform can also simulate the physical behaviors and characteristics of the IC components in operation.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 2A, FIG. 2B and FIG. 2C are diagrams illustrating a circuit layout in accordance with some embodiments of the present disclosure.

DETAILED DESCRIPTION

Figure 1:
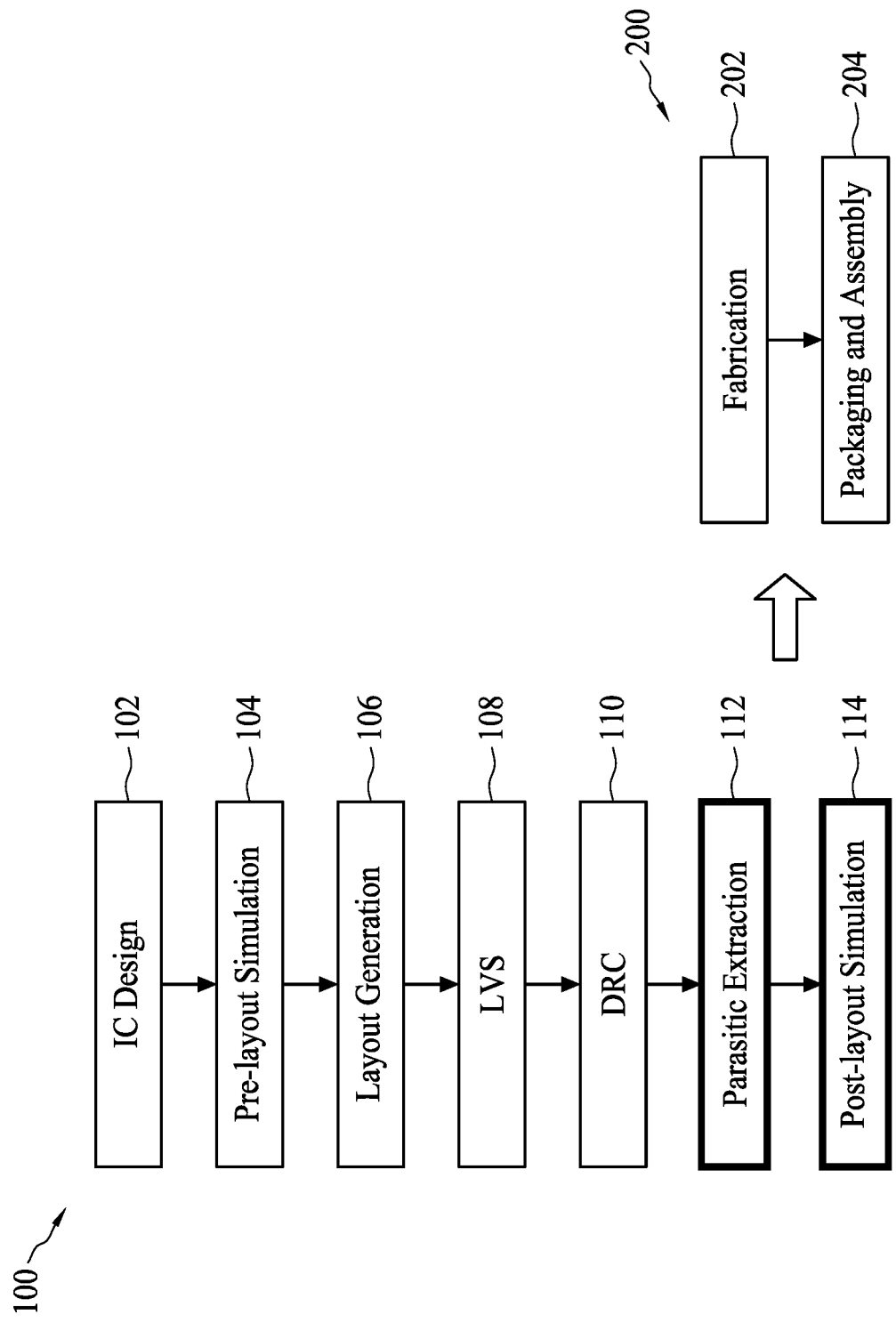
FIG. 1 is a flowchart of a chip design flow and a chip manufacturing flow of an integrated device or IC chip in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

FIG. 1 is a flowchart of a chip design flow 100 and a chip manufacturing flow 200 of an integrated device or IC chip in accordance with some embodiments. The design flow 100 utilizes one or more electronic design automation (EDA) tools to carry out one or more stages in the design flow 100. The chip manufacturing flow 200 manufactures the integrated device based on a result of the design flow 100.

At an IC design stage 102, a design of the integrated device is provided by a circuit designer. The design of the integrated device includes one or more circuit blocks and connections described by a pre-layout netlist. The pre-layout netlist does not include information regarding the physical implementation of the circuits and thus does not include information regarding sizing, spacing and placement of the elements of the circuits or of parasitic elements such as parasitic capacitors and parasitic resistors that arise due to the physical implementation. The term "netlist" used herein can refer to both a graphic description of a circuit depicted in a schematic and a textual description of the circuit.

At a pre-layout simulation stage 104, a pre-layout simulation is performed using the pre-layout netlist to determine whether the design meets a predetermined specification. If the design does not meet the predetermined specification, the integrated device is redesigned.

At a layout generation stage 106, a layout of the integrated device is generated based on the design. In some embodiments, for standard cell designs, full custom layouts are created for cells, and the layout of the integrated device is generated by an automatic place-and-route tool using the cell layouts. In other embodiments, a full custom layout is created for the entire design. In still other embodiments, the layout of the integrated device includes both a full-custom portion and an automatically generated portion.

At a layout versus schematic (LVS) stage 108, an LVS check is performed to ensure the generated layout corresponds to the design. An LVS tool recognizes circuit elements and connections therebetween from patterns in the generated layout, and produces a post-layout netlist representing the recognized circuit elements and connections. The LVS tool then checks whether the post-layout netlist generated from the layout is equivalent to the pre-layout netlist generated from the design. If equivalence is not attained, the design flow 100 returns to the IC design stage 102 and/or the layout generation stage 106 to make corrections.

At a design rule check (DRC) stage 110, a DRC check is performed on the layout to ensure that the layout satisfies certain manufacturing design rules such as the minimum width of a pattern in the layout, a minimum spacing between adjacent patterns in the layout, and a minimum area of a pattern in the layout. If one or more design rules are violated, correction is made to at least one of the layout or the design by returning to the IC design stage 102 or the layout generation stage 106. Some embodiments of the present disclosure are applied in this stage, as will be discussed in detail below.

At a parasitic extraction stage 112, parasitic elements, such as parasitic resistance and parasitic capacitance of interconnects in the layout, are determined and back-annotated in the post-layout netlist.

At a post-layout simulation stage 114, a post-layout simulation is performed on the post-layout netlist to determine whether the layout meets a predetermined specification. If the simulation indicates that the layout does not meet the predetermined specification, optimization is made to at least one of the design or the layout by returning to the IC design stage 102 or the layout generation stage 106. Otherwise, the layout undergoes additional verification process for signoff. For example, the post-layout simulation can be a SPICE (Simulation Program with Integrated Circuit Emphasis) simulation.

In some embodiments, the chip manufacturing flow 200 includes a fabrication stage 202 and a packaging and assembly stage 204.

During the fabrication stage 202, one or more photomasks are used, for example, for a patterning operation for forming, on a wafer, features of the integrated device, such as transistor gate lines, source or drain regions for the transistors, metal lines for interconnects or vias for the interconnects.

During the packaging and assembly stage 204, the integrated devices on the wafer are diced into IC chips and are packaged while taking into consideration, for example, protection from mechanical damage, cooling, electromagnetic interference and protection from electrostatic discharge. An IC chip may be assembled with other components for use.

The design flow 100 and the chip manufacturing flow 200 in FIG. 1 are exemplary. Other sequences of the stages, partitioning of the stages, and/or additional stages before, between or after the stages shown are within the applicable scope of the present disclosure.

During the DRC stage 110, the layout of the integrated device is checked to ensure that the layout satisfies certain manufacturing design rules. The DRC stage 110 is discussed in detail below.

FIG. 2A, FIG. 2B and FIG. 2C are diagrams illustrating a circuit layout 310 in accordance with some embodiments of the present disclosure. The operations of the DRC stage 110 shown in FIG. 1 may be performed on the circuit layout 310. Referring to FIG. 2A, the circuit layout 310 may include a first power unit 311 and a second power unit 313. The first power unit 311 includes a power path 312 extending in a first direction and a power path 316 extending in a second direction substantially orthogonal to the first direction. The second power unit 313 includes a power path 314 extending in the first direction and a power path 318 extending in the second direction. In the present embodiment, the power path 312 and the power path 314 are aligned in a first direction D1 (e.g., the horizontal direction), and the power path 316 and the power path 318 are aligned in a second direction D2 (e.g., the vertical direction). In some embodiments, the power path 312 and the power path 314 may be connected to the power supply (i.e., VDD) or the ground (i.e., VSS), and the power path 316 and the power path 318 may also be connected to the power supply (i.e., VDD) or the ground (i.e., VSS).

It should be noted that the circuit layout 310 may include a plurality of power units to form a power grid for delivering power to the integrated device. Further, the power path 312 and the power path 314 are at a same layer, while the power path 316 and the power path 318 are at another same layer. The power paths 312 and 314 are at a different layer from the power paths 316 and 318. The power path 312 and the power path 316 are connected through a via 315, and the power path 314 and the power path 318 are connected through a via 317.

In some embodiments, a signal path 324 may be disposed between the power path 312 and the power path 314. A pitch P1 between the power path 312 and the power path 314 may be generated according to the custom layout rule. In addition, the pitch P1 may be smaller than a threshold pitch TP. The threshold pitch TP is a pitch required for the signal path 324 to be disposed between the power path 312 and the power path 314. For example, the threshold pitch TP as required is at least greater than a length L of the signal path 324. In some embodiments, the threshold pitch TP is expressed by an equation (1):

$$TP = L + 2*S_{min} \quad (1)$$

Wherein TP is the threshold pitch, L is the length of a signal path, and $S_{min}$ is a minimum required pitch between a power path and the signal path.

In some embodiments, the minimum required pitch $S_{min}$ is used to avoid a short circuit issue between the power paths 312, 314 and the signal path 324. It should be noted that the pitch between the power path 312 and the signal path 324 and the pitch between the power path 314 and the signal path 324 may be set to be the same or different, and the example given here is not intended to be limiting.

Referring to FIG. 2B, when the pitch P1 (shown in FIG. 2A) is determined to be smaller than the threshold pitch TP, the second power unit 313 is modified by relocating the second power unit 313 in the second direction D2. In some embodiments, the power path 314 is shifted upward in the second direction D2. The power path 314 may be shifted by a predetermined distance 322 (e.g., shifted to the next layout track) along the second direction D2. In some other embodiments, the power path 314 may be shifted downward in the second direction D2. Moreover, the power path 318 in the second power unit 313 is shifted together with the power path 314.

The signal path 324 is disposed between the first power unit 311 and the modified second power unit 313. In some embodiments, the signal path 324 is at the same layer as the power path 312 and the power path 314. In other embodiments, the signal path 324 may be at a different layer from the power path 312 and the power path 314. Referring to FIG. 2C, in some embodiments, all of the second power units 313 on the same column in the modified circuit layout 320 are shifted upward in the second direction D2. It should be noted that shifting the second power unit 313 upward or downward is an example only, and is not intended to be limiting.

In one or more embodiments, the pitch between the power paths aligned in the second direction D2 (i.e., the power paths in the different rows in the vertical direction) may also be modified in a similar manner and is omitted herein for brevity.

Therefore, during the DRC stage 110 in FIG. 1, the space between the power path 312 and the power path 314 is checked to determine whether the space is sufficient for the signal path 324. If the space between the power path 312 and the power path 314 is determined to be insufficient for the signal path 324, all of the second power units 313 on the same column may be modified to shift by the same distance in the same direction. In other words, the short circuit issue between the power paths 312, 314 and the signal path 324 may be automatically checked and prevented during the design flow.

Figure 3:
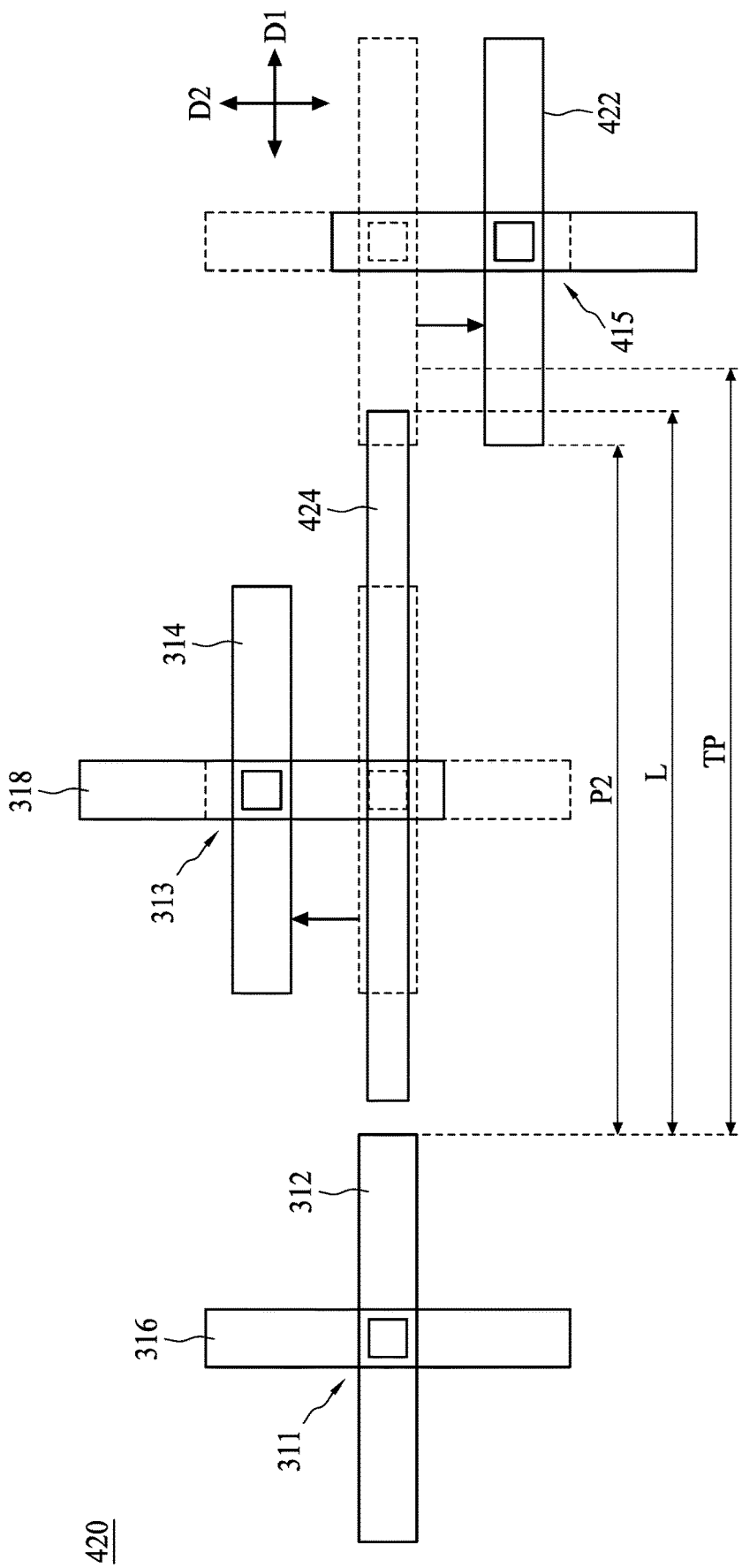
FIG. 3 is a diagram illustrating a circuit layout in accordance with some embodiments of the present disclosure.

FIG. 3 shows a circuit layout in accordance with some embodiments of the present disclosure. In some embodiments, depending on the length L of the signal path 424, more than one power unit may need to be modified. For example, the threshold pitch TP for the signal path 424 can be greater than the first pitch (e.g., the first pitch P1 in FIG. 2A) between the power path 312 and the power path 314, wherein the threshold pitch TP is also greater than the second pitch P2 between the power path 312 and the power path 422 in the third power unit 415. As mentioned above, the second power unit 313 may be modified as described in FIG. 2A and FIG. 2B, and the description thereof is omitted herein for brevity.

In some embodiments, the power path 422 in the third power unit 415 may be modified in a manner similar to that of the second power unit 413. For example, the second power unit 313 may be shifted upward in the second direction D2 and the third power unit 415 may be shifted downward in the second direction D2. The power path 422 may be shifted by the same predetermined distance (e.g., the predetermined distance 322 in FIG. 2B) as the power path 314. It should be noted that shifting the second power unit 313 and the third power unit 415 upward or downward is provided as an example, and is not intended to be limiting. The second power unit 313 and the third power unit 415 may be shifted upward or downward together.

Like the second power unit 313, all of the third power units 415 on the same column (e.g., the third column from the left in FIG. 2C) in the modified circuit layout 420 may be shifted downward in the second direction D2. Alternatively, other columns may be shifted upward or downward, and descriptions thereof are omitted herein for brevity.

Figure 4A:
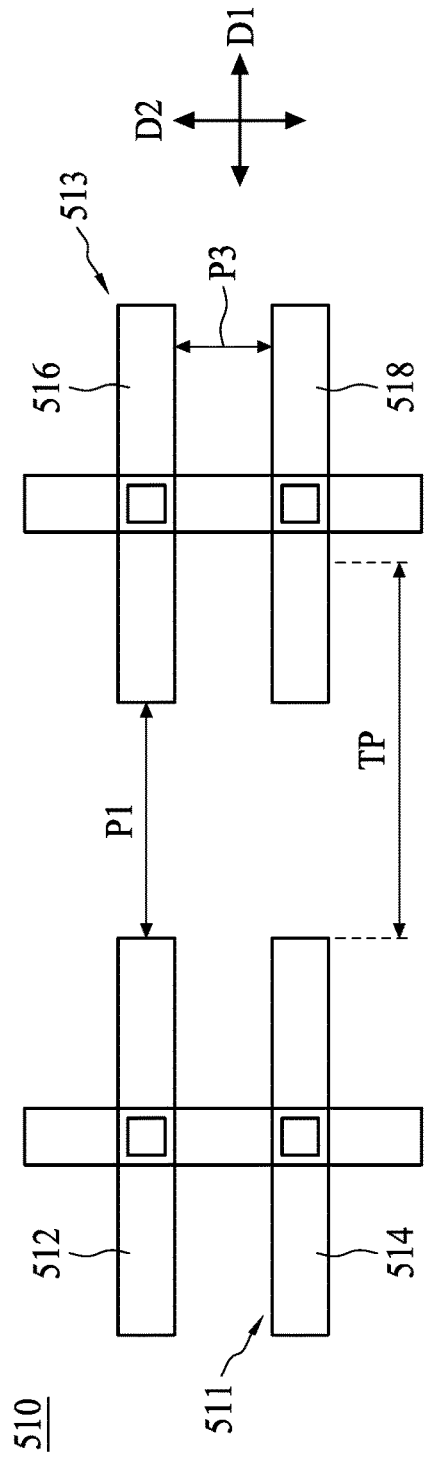
FIG. 4A and FIG. 4B are diagrams illustrating a circuit layout in accordance with some embodiments of the present disclosure.
Figure 4B:
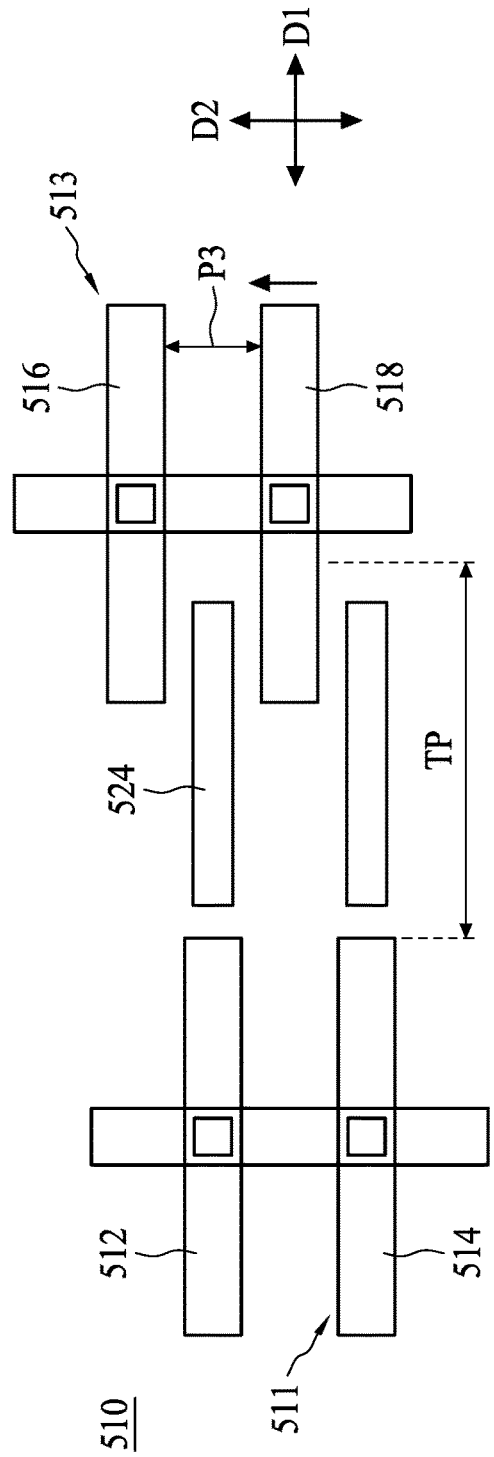

FIG. 4A and FIG. 4B are diagrams illustrating a circuit layout in accordance with some embodiments of the present disclosure. In some embodiments, the first power unit 511 may include a plurality of power paths arranged in parallel (e.g., the power path 512 and the power path 514, parallel to each other), and the second power unit 513 may include a plurality of power paths arranged in parallel (e.g., the power path 516 and the power path 518, parallel to each other). The power path 512 and the power path 514 are separated by a predetermined pitch P3. The power path 516 and the power path 518 may also be separated by the same predetermined pitch P3 or by other pitches. The power paths 512, 514, 516 and 518 are all parallel in the first direction D1 (e.g., the horizontal direction).

As with the circuit layout 310 in FIG. 3A, if the first pitch P1, between the power path 512 in the first power unit 511 and the power path 516 in the second power unit 513, is less than the threshold pitch TP for the signal path 524, the second power unit 513 may be modified in the second direction D2 (e.g., the vertical direction). The power paths 516 and 518 in the second power unit 513 are shifted upward together, and the predetermined pitch P3 between the power paths 516 and 518 is fixed. Thus, all of the second power units 513 on the same column in the modified circuit layout 520 are shifted upward in the second direction D2. Alternatively, the second power unit 513 may be shifted downward, and the example described herein is not intended to be limiting.

When the space between the first power unit 511 and the second power unit 513 is determined to be insufficient for the signal path 524, all of the second power units 513 on the same column may be modified to shift the same distance in the same direction. Thus, the short circuit issue between the power path and the signal path may be automatically checked and prevented during the design flow.

Figure 5:
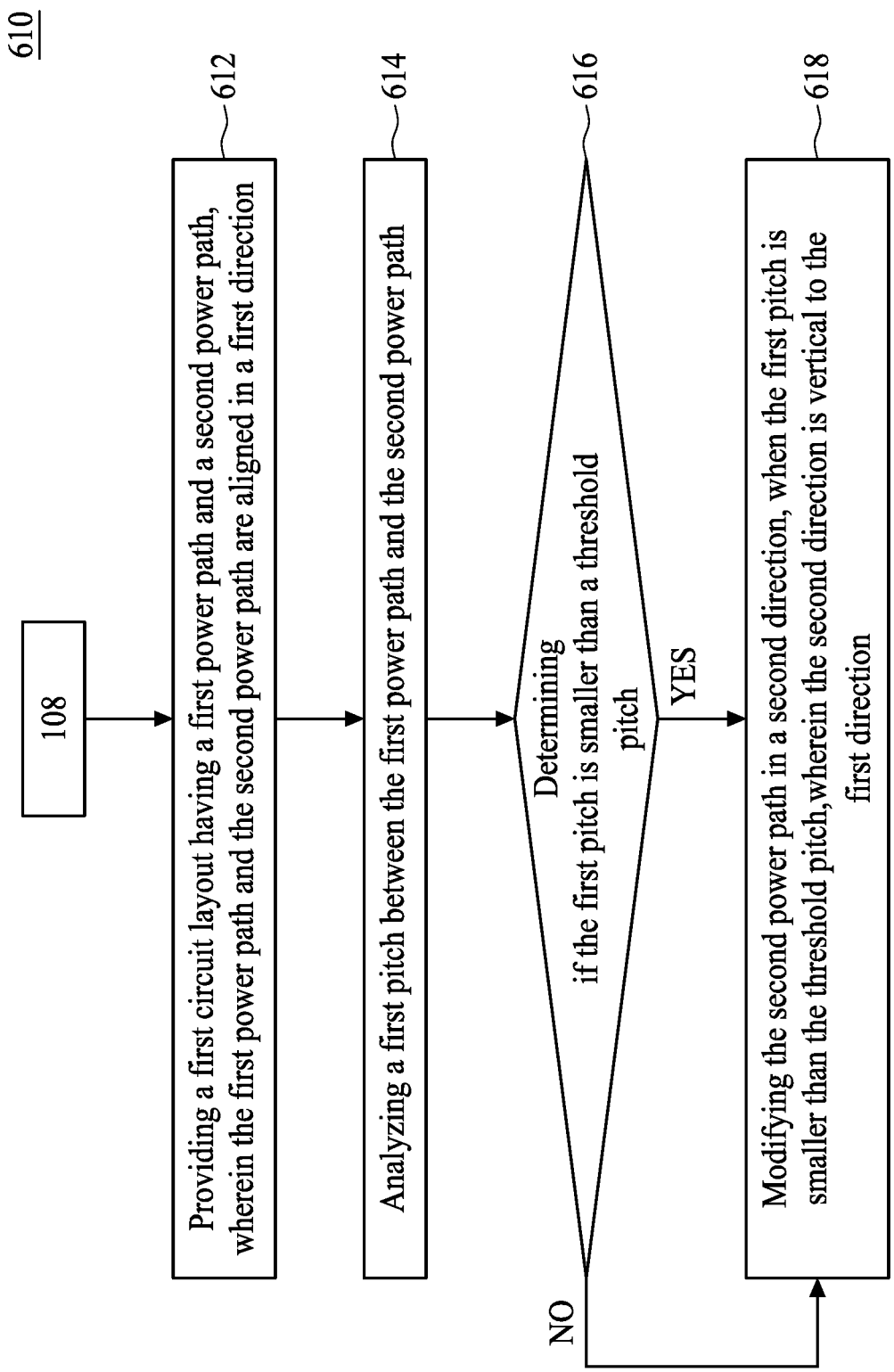
FIG. 5 is a flowchart illustrating a DRC stage in accordance with some embodiments of the present disclosure.

FIG. 5 is a flowchart illustrating a DRC stage in accordance with some embodiments of the present disclosure. The steps of the DRC stage 610 may be performed on the circuit layouts 310 and 510 shown in FIG. 2A and FIG. 4A. The DRC stage 610 may include operations 612, 614, 616 and 618. In operation 612, a first circuit layout having a first power path and a second power path is provided. The first power path and the second power path are aligned in a first direction.

In operation 614, a first pitch between the first power path and the second power path is analyzed. In operation 616, it is determined whether the first pitch is less than a threshold pitch. In operation 618, if the first pitch is less than the threshold pitch, the second power path is modified in a second direction. The second direction is perpendicular to the first direction. The detailed descriptions of such operations are similar to the descriptions of the operations shown in FIG. 2A, FIG. 2B, FIG. 2C, FIG. 3, FIG. 4A and FIG. 4B, and thus are omitted for brevity.

Figure 6:
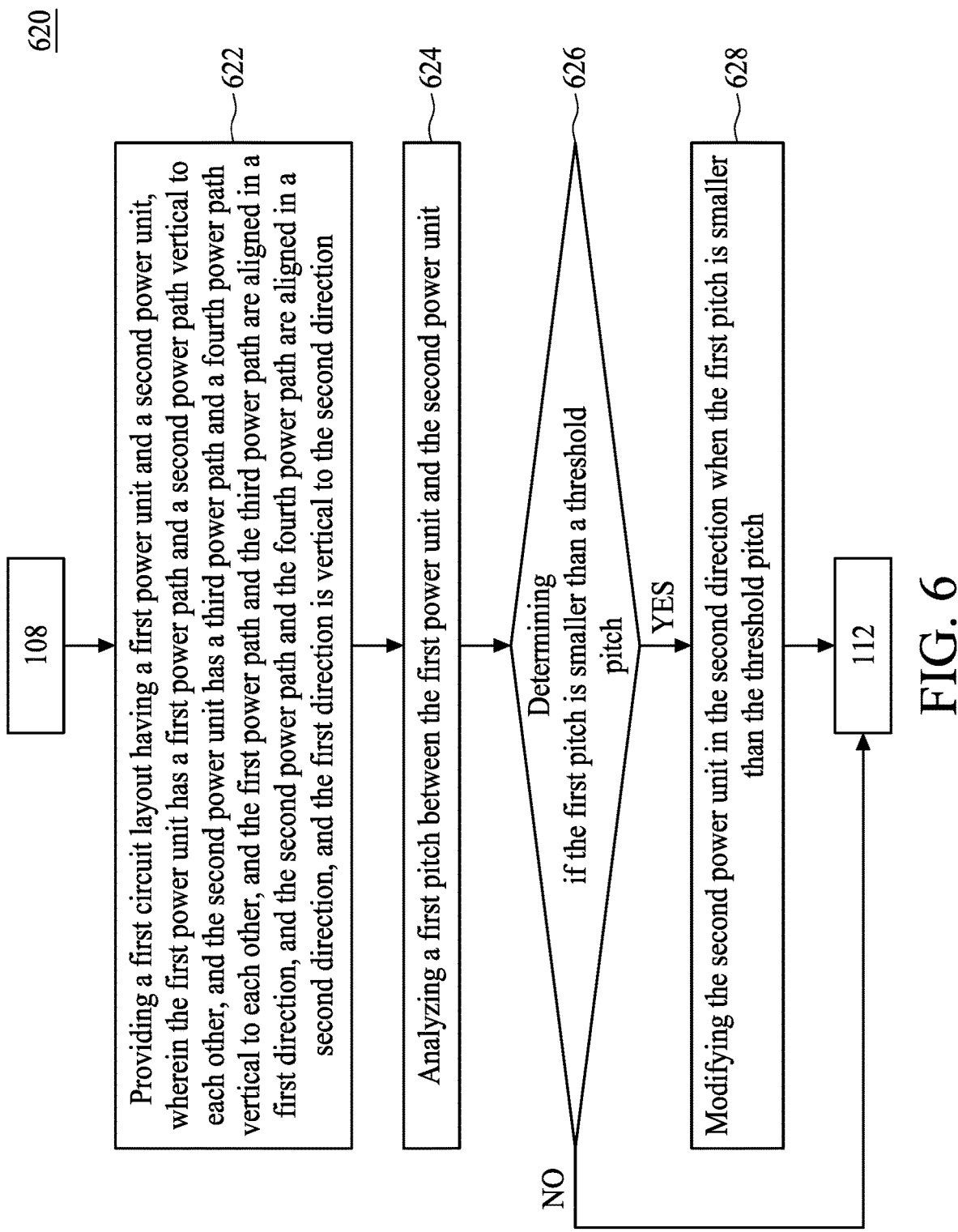
FIG. 6 is a flowchart illustrating a DRC stage in accordance with some embodiments of the present disclosure.

FIG. 6 is a flowchart illustrating a DRC stage in accordance with some embodiments of the present disclosure. The steps of the DRC stage 620 may be performed on the circuit layouts 310 and 510 shown in FIG. 2A and FIG. 4A. The DRC stage 620 may include operations 622, 624, 626 and 628. In operation 622, a first circuit layout having a first power unit and a second power unit is provided. The first power unit has a first power path and a second power path perpendicular to each other. The second power unit has a third power path and a fourth power path perpendicular to each other. The first power path and the third power path are aligned in a first direction. The second power path and the fourth power path are aligned in a second direction. The first direction is perpendicular to the second direction.

In operation 624, a first pitch between the first power unit and the second power unit is analyzed. In operation 626, it is determined whether the first pitch is less than a threshold pitch. In operation 628, if the first pitch is less than the threshold pitch, the second power unit is modified in a second direction. The second direction is perpendicular to the first direction. The detailed descriptions of such operations are similar to the descriptions of the operations shown in FIG. 2A, FIG. 2B, FIG. 2C, FIG. 3, FIG. 4A and FIG. 4B, and thus are omitted for brevity.

Figure 7:
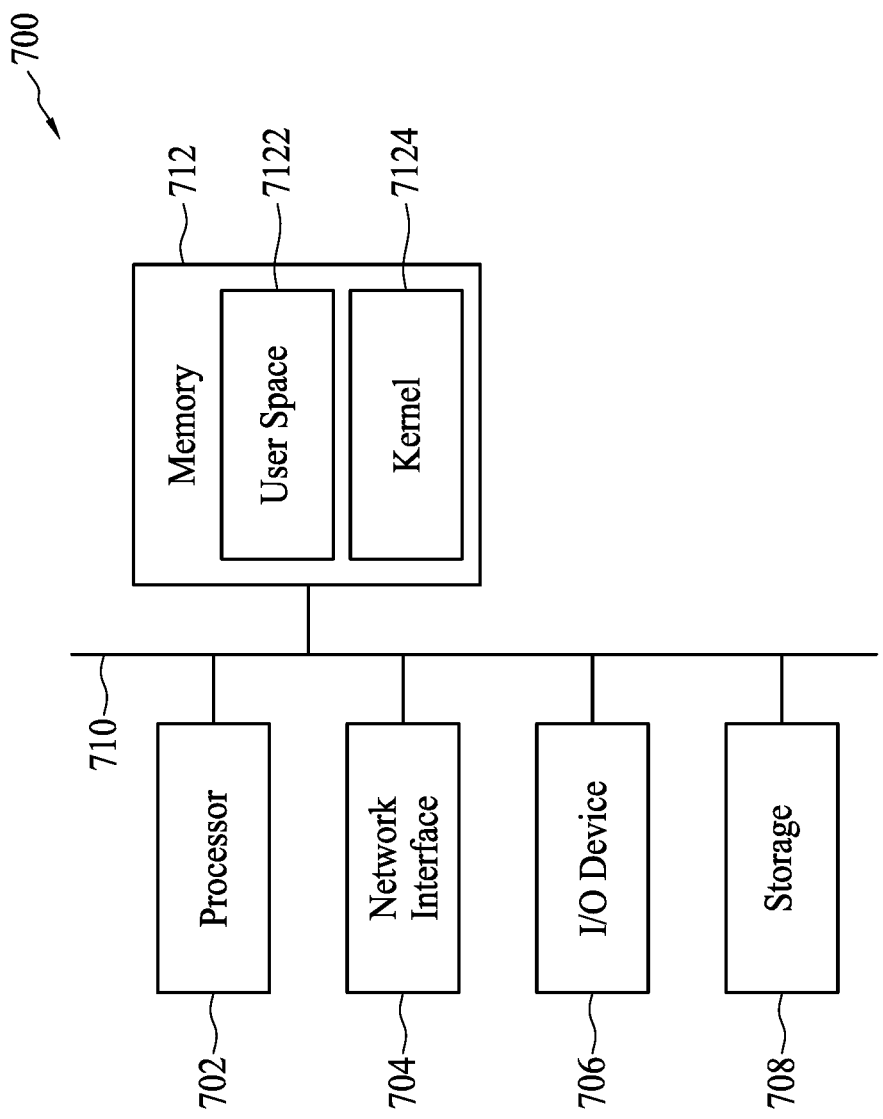
FIG. 7 is a diagram of a hardware system for implementing the DRC stage to generate the second circuit layout in accordance with some embodiments.

FIG. 7 is a diagram of a hardware system 700 for implementing the DRC stage 110 (or the DRC stage 610 or 620) to generate the second circuit layout 320, 420 or 520 in accordance with some embodiments. The system 700 includes at least one processor 702, a network interface 704, an input and output (I/O) device 706, a storage 708, a memory 712 and a bus 710. The bus 710 couples the network interface 704, the I/O device 706, the storage 708 and the memory 712 to the processor 702.

In some embodiments, the memory 712 includes a random access memory (RAM) and/or other volatile storage device, and/or a read-only memory (ROM) and/or other non-volatile storage device. The memory 712 includes a kernel 7124 and user space 7122, configured to store program instructions to be executed by the processor 702 and data accessed by the processor.

In some embodiments, the network interface 704 is configured to access program instructions and data stored remotely through a network. The I/O device 706 includes an input device and an output device configured for enabling user interaction with the system 700. The input device includes, for example, a keyboard, a mouse or other input device. The output device includes, for example, a display, a printer or other output device. The storage device 708 is configured for storing program instructions and data accessed by the program instructions. The storage device 708 includes, for example, a magnetic disk and an optical disk.

In some embodiments, the processor 702 is configured to perform, according to the program instructions, the operations of the DRC stage 110 (or the DRC stage 610 or 620) as described with reference to FIG. 1 (or FIG. 5 or FIG. 6).

In some embodiments, the program instructions are stored in a non-transitory computer readable recording medium such as one or more optical disks, hard disks or non-volatile memory devices.

Figure 8:
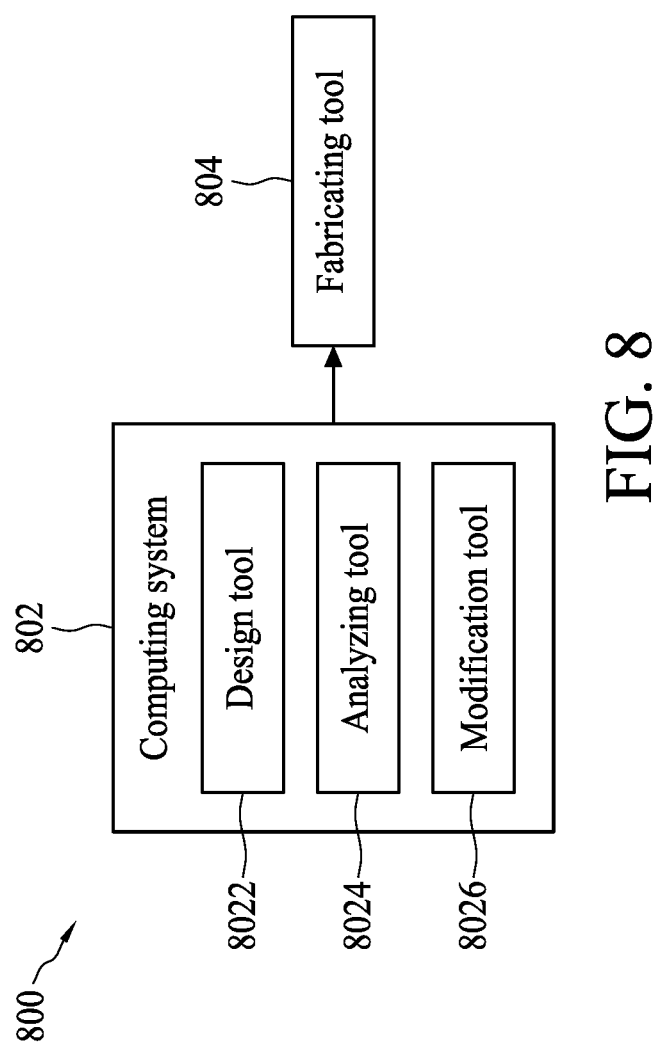
FIG. 8 is a diagram of a system for fabricating the second circuit layout in accordance with some embodiments.

FIG. 8 is a diagram of a system 800 for fabricating the second circuit layout 320, 420, or 520 in accordance with some embodiments. The system 800 includes a computing system 802 and a fabricating tool 804. The computing system 802 is arranged to perform operations of the DRC stage 110 (or the DRC stage 610 or 620) to generate the modified circuit layout 320, 420 or 520 of the integrated device. According to some embodiments, the computing system 802 may include the hardware system 700 shown in FIG. 7. In some embodiments, the computing system 802 may include a design tool 8022, an analyzing tool 8024 and a modification tool 8026. In one or more embodiments, the computing system 802 may function as the EDA tools.

The design tool 8022 is arranged to provide a circuit layout having a first power path and a second power path formed therein. The first power path and the second power path are aligned in a first direction. The circuit layout may be the circuit layout 310 or 510. The design tool 8022 may be implemented by the processor 702 and the storage 708, wherein the processor 702 may access the storage 708 to provide a stored circuit layout.

The analyzing tool 8024 is arranged to analyze a first pitch between the first power path and the second power path to determine whether the first pitch is less than a threshold pitch. The analyzing tool 8024 may analyze the first pitch between the first power path and the second power path using the operations described in FIG. 6 and FIG. 7; such operations have been described and are omitted herein for brevity. The analyzing tool 8024 may be implemented by the processor 702, wherein the processor 702 may analyze the first pitch between the first power path and the second power path to determine whether the first pitch is less than a threshold pitch.

The modification tool 8026 is arranged to modify the second power path in a second direction when the first pitch is less than the threshold pitch, and to generate a second circuit layout according to the modified first circuit layout. The second direction is perpendicular to the first direction. The modification tool 8026 may modify the second power path using the operations described in FIG. 2B, FIG. 3 and FIG. 4B; such operations are therefore omitted herein for brevity. The modification tool 8026 may be implemented by the processor 702, wherein the processor 702 may modify the second power path to generate the second circuit layout.

The fabricating tool 804 may be a cluster tool for fabricating an integrated device. The cluster tool may be a multiple reaction chamber type composite tool, which includes a polyhedral transfer chamber including a wafer-handling robot inserted at the center of the polyhedral transfer chamber; a plurality of process chambers positioned at each wall face of the polyhedral transfer chamber; and a load lock chamber installed at a wall face of the polyhedral transfer chamber. At the fabrication stage, at least one photomask is used, for example, for a patterning operation for forming, on a wafer, IC features, such as transistor gate lines, source or drain regions for the transistors, metal lines for interconnects, or vias for the interconnects.

According to some embodiments, a method for forming an integrated device is provided. The method includes the following operations. A first circuit layout having a first power path and a second power path is provided. The first power path and the second power path are aligned in a first direction. A first pitch between the first power path and the second power path is analyzed. It is determined whether the first pitch is less than a threshold pitch. If the first pitch is less than the threshold pitch, the second power path is modified in a second direction. The second direction is perpendicular to the first direction.

According to other embodiments, a method for forming an integrated device is provided. A first circuit layout having a first power unit and a second power unit is provided. The first power unit has a first power path and a second power path perpendicular to each other. The second power unit has a third power path and a fourth power path perpendicular to each other. The first power path and the third power path are aligned in a first direction. The second power path and the fourth power path are aligned in a second direction. The first direction is perpendicular to the second direction. A first pitch between the first power unit and the second power unit is analyzed. It is determined whether the first pitch is less than a threshold pitch. If the first pitch is less than the threshold pitch, the second power unit is modified in a second direction. The second direction is perpendicular to the first direction.

According to other embodiments, a system for forming an integrated device is provided. The system includes a design tool, an analyzing tool, a modification tool and a fabricating tool. The design tool is arranged to provide a circuit layout having a first power path and a second power path formed therein. The first power path and the second power path are aligned in a first direction. The analyzing tool is arranged to analyze a first pitch between the first power path and the second power path to determine whether the first pitch is less than a threshold pitch. The modification tool is arranged to modify the second power path in a second direction when the first pitch is less than the threshold pitch, and to generate a second circuit layout according to the modified first circuit layout. The second direction is perpendicular to the first direction. The fabricating tool is arranged to generate the integrated device according to the second circuit layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for forming an integrated device, comprising:
providing a first circuit layout having a first power path and a second power path, wherein the first power path and the second power path are aligned in a first direction;
analyzing a first pitch between the first power path and the second power path;
determining whether the first pitch is less than a threshold pitch;
modifying the second power path in a second direction if the first pitch is less than the threshold pitch, wherein the second direction is perpendicular to the first direction;
generating a second circuit layout according to the modified first circuit layout; and
fabricating the integrated device according to the second circuit layout.

2. The method of claim 1, wherein the modifying of the second power path in the second direction if the first pitch is less than the threshold pitch comprises:
modifying the second power path a predetermined distance along the second direction.

3. The method of claim 1, wherein the first circuit layout further includes a third power path, wherein the first power path, the second power path, and the third power path are aligned in the first direction, wherein the method further comprises:
analyzing a second pitch between the first power path and the third power path to determine whether the second pitch is less than the threshold pitch.

4. The method of claim 3, further comprising:
modifying the third power path in the second direction if the second pitch is less than the threshold pitch.

5. The method of claim 4, wherein the modifying of the third power path in the second direction if the second pitch is less than the threshold pitch comprises:
modifying the third power path a predetermined distance along the second direction.

6. The method of claim 1, further comprising:
forming a signal path between the first power path and the second power path, wherein the signal path is parallel to the first power path and the second power path.

7. The method of claim 6, wherein the threshold pitch is greater than a length of the signal path.

8. The method of claim 7, wherein the threshold pitch is expressed by an equation (1):

$$TP = L + 2 * S_{min} \quad (1)$$

wherein
TP is the threshold pitch;
L is the length of the signal path; and
$S_{min}$ is a minimum required pitch between first power path and the signal path.

9. The method of claim 1, wherein the first circuit layout has a third power path, and wherein the third power path is parallel to the second power path and separated from the second power path by a predetermined pitch.

10. The method of claim 9, further comprising:
modifying the third power path together with the second power path, wherein the predetermined pitch is fixed.

11. A method for forming an integrated device, comprising:
providing a first circuit layout having a first power unit and a second power unit, wherein the first power unit has a first power path and a second power path perpendicular to each other, the second power unit has a third power path and a fourth power path perpendicular to each other, the first power path and the third power path are aligned in a first direction, the second power path and the fourth power path are aligned in a second direction, and the first direction is perpendicular to the second direction;
analyzing a first pitch between the first power unit and the second power unit;
determining whether the first pitch is less than a threshold pitch;
modifying the second power unit in the second direction if the first pitch is less than the threshold pitch;
generating a second circuit layout according to the modified first circuit layout; and
fabricating the integrated device according to the second circuit layout.

12. The method of claim 11, wherein the modifying of the second power unit in the second direction if the first pitch is less than the threshold pitch comprises:
modifying the second power unit a predetermined distance along the second direction.

13. The method of claim 11, wherein the first circuit layout has a third power unit, the third power unit has a fifth power path and a sixth power path perpendicular to each other, the first power path and the fifth power path are aligned in the first direction, the second power path and the sixth power path are aligned in the second direction, and the method further comprises:
analyzing a second pitch between the first power unit and the third power unit to determine whether the second pitch is less than the threshold pitch.

14. The method of claim 13, further comprising:
modifying the third power unit in a second direction if the second pitch is less than the threshold pitch.

15. The method of claim 11, further comprising:
forming a signal path between the first power unit and the second power unit, wherein the signal path is parallel to the first power path and the third power path.

16. A system for forming an integrated device, comprising:
a design tool, arranged to provide a first circuit layout having a first power path and a second power path formed therein, wherein the first power path and the second power path are aligned in a first direction;
an analyzing tool, arranged to analyze a first pitch between the first power path and the second power path to determine whether the first pitch is less than a threshold pitch;
a modification tool, arranged to modify the second power path in a second direction if the first pitch is less than the threshold pitch, and to generate a second circuit layout according to the modified first circuit layout, wherein the second direction is perpendicular to the first direction;
a fabricating tool, arranged to generate the integrated device according to the second circuit layout.

17. The system of claim 16, wherein the modification tool modifies the second power path a predetermined distance along the second direction.

18. The system of claim 16, wherein the first circuit layout further has a signal path formed between the first power path and the second power path, wherein the signal path is parallel to the first power path and the second power path.

19. The system of claim 18, wherein the threshold pitch is greater than a length of the signal path.

20. The system of claim 19, wherein the threshold pitch is expressed by an equation (1):

$$TP = L + 2 * S_{min} \tag{1}$$

wherein
TP is the threshold pitch;
L is the length of the signal path; and
$S_{min}$ is a minimum required pitch between first power path and the signal path.

* * * * *